US010498699B2

(12) United States Patent
Altmann et al.

(10) Patent No.: US 10,498,699 B2
(45) Date of Patent: *Dec. 3, 2019

(54) RELIABILITY BASED DYNAMIC CONTENT RECOMMENDATION

(71) Applicant: Pearson Education, Inc., New York, NY (US)

(72) Inventors: Robert A. Altmann, Buffalo, MN (US); Cecil R. Reynolds, Austin, TX (US); Randy Kamphaus, Athens, GA (US); Jinosh K. Phillip, San Antonio, TX (US); Stacey L. Goros, Spring Branch, TX (US); Andrea L. Olson, Richfield, MN (US)

(73) Assignee: PEARSON EDUCATION, INC., Bloomington, MN (US)

(*) Notice: Subject to any disclaimer, the term of this patent is extended or adjusted under 35 U.S.C. 154(b) by 176 days.

This patent is subject to a terminal disclaimer.

(21) Appl. No.: 15/610,449

(22) Filed: May 31, 2017

(65) Prior Publication Data

US 2018/0198758 A1 Jul. 12, 2018

Related U.S. Application Data

(63) Continuation of application No. 15/490,733, filed on Apr. 18, 2017.

(Continued)

(51) Int. Cl.
*H04L 29/06* (2006.01)
*H04L 29/08* (2006.01)

(52) U.S. Cl.
CPC ...... *H04L 63/0254* (2013.01); *H04L 63/0281* (2013.01); *H04L 63/1425* (2013.01);

(Continued)

(58) Field of Classification Search
CPC ............. H04L 63/0254; H04L 63/061; H04L 63/0457; H04L 63/0853; H04L 65/403;

(Continued)

(56) References Cited

U.S. PATENT DOCUMENTS 9,923,851 B1 3/2018 Sprauve et al.
9,924,222 B2 3/2018 Seo et al.
(Continued)

OTHER PUBLICATIONS

Krešimir Kroflin et al., Framework for Implementation of Complex Dynamic Web Forms, May 2012, '2012 Proceedings of the 35th International Convention MIPRO', pp. 421-423.*

(Continued)

*Primary Examiner* — Farid Homayounmehr
*Assistant Examiner* — Raied A Salman
(74) *Attorney, Agent, or Firm* — Quarles & Brady LLP

(57) ABSTRACT

Systems and methods for automatic content remediation notification are disclosed herein. The system can include memory that can contain a content library database. The system can include a first user device and one or more servers. The one or more servers can: receive a content aggregation creation request from the first user device; identify content information associated with a set of the plurality of data packets; apply a filter request to the set of the plurality of data packets; automatically provide information relating to data packets in the restricted set of data packets to the first user device; receive content aggregate information identifying a content aggregate from the first user device; evaluate the content aggregate according to the metadata associated with the data packets of the content aggregate; and output an indicator of the evaluation result to the first user device.

20 Claims, 16 Drawing Sheets

Related U.S. Application Data

(60) Provisional application No. 62/443,221, filed on Jan. 6, 2017.

(52) U.S. Cl.
CPC ........ *H04L 67/306* (2013.01); *H04L 67/1097* (2013.01); *H04L 67/2804* (2013.01); *H04L 69/22* (2013.01)

(58) Field of Classification Search
CPC ..... H04L 67/26; H04L 67/1095; H04L 51/16; H04L 43/106; G06F 17/30035; G06F 17/30044; G06F 17/30041; G06F 17/30867; G06F 17/24; G06F 17/2288; G06F 17/3053; G06F 3/0481; G06F 16/955; G06Q 30/0243
USPC ................................................ 726/13; 707/6
See application file for complete search history.

(56) References Cited

U.S. PATENT DOCUMENTS

| | | | |
|---|---|---|---|
| 2006/0080171 A1* | 4/2006 | Jardins | G06Q 10/087 705/14.68 |
| 2008/0005086 A1* | 1/2008 | Moore | G06F 16/955 |
| 2008/0155602 A1 | 6/2008 | Collett et al. | |
| 2009/0327288 A1* | 12/2009 | Silverman | G06F 16/48 |
| 2011/0047237 A1 | 2/2011 | Walsh et al. | |
| 2014/0033068 A1* | 1/2014 | Gupta | G06Q 10/103 715/751 |
| 2014/0297398 A1* | 10/2014 | Sharifzadeh | G06Q 30/0243 705/14.42 |
| 2014/0330794 A1* | 11/2014 | Dellenbach | H04L 67/2833 707/692 |
| 2014/0369550 A1* | 12/2014 | Davis | G06Q 30/0201 382/100 |
| 2015/0161238 A1* | 6/2015 | Son | G06F 3/167 707/728 |
| 2015/0163206 A1* | 6/2015 | McCarthy | G06F 21/6227 713/171 |
| 2015/0309701 A1 | 10/2015 | Jatzold et al. | |
| 2017/0289210 A1* | 10/2017 | Pai | H04L 65/403 |
| 2018/0150462 A1* | 5/2018 | Hanes | G06Q 10/109 |

OTHER PUBLICATIONS

Reynolds, Cecil R. et al, BASCT™ 3 Flex Monitor "The flexibility you need to make monitoring behavior changes personal" http://www.pearsonclinical.com/education/products/100001542/basc3-flex-monitor.html#tab-resources, May 5, 2015, al 1 pages.

* cited by examiner

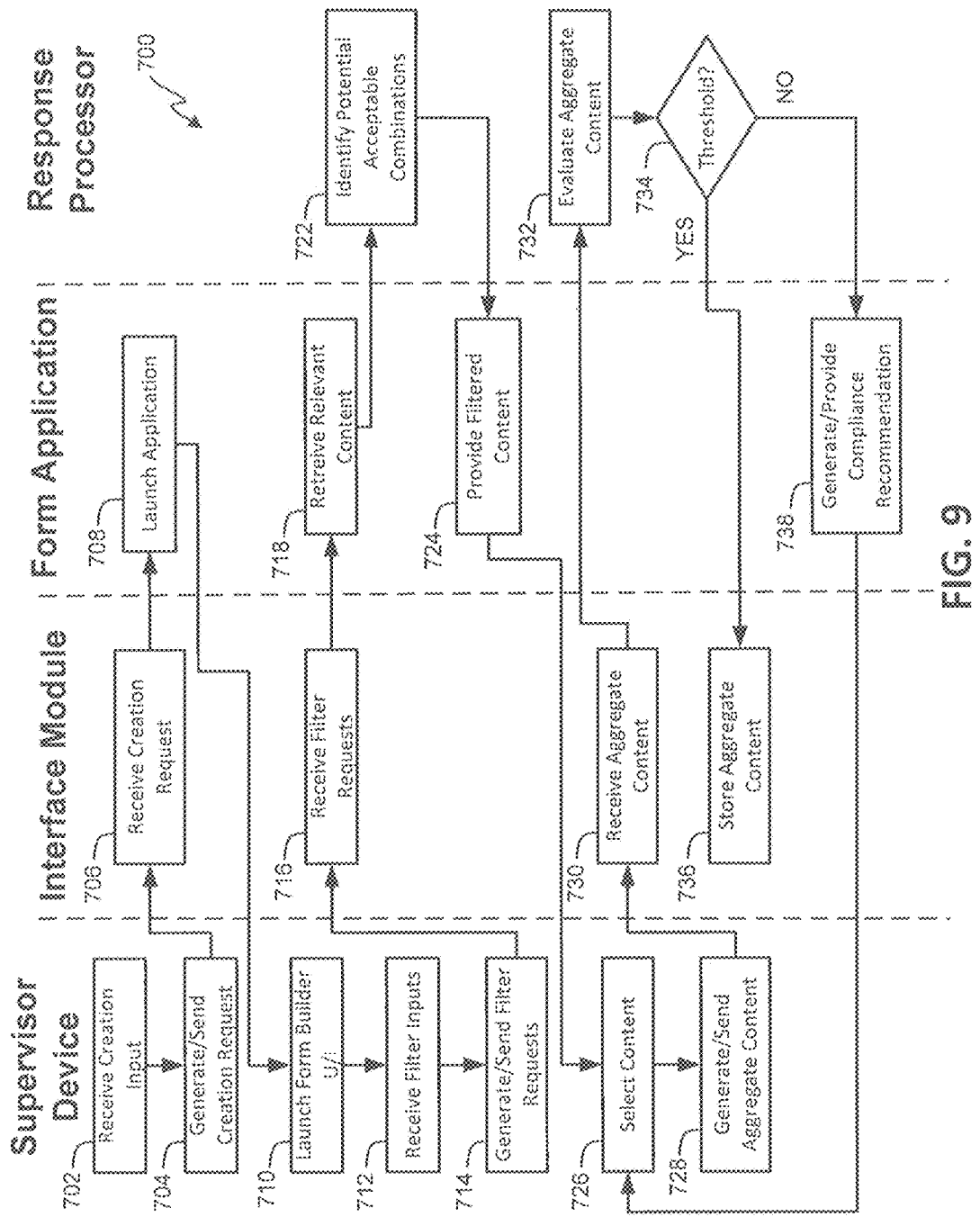

Manage BASC-3 Flex Monitor Forms

Create New Form — 854

| Open | Create a Copy | Change Status | Generate PDF ▼ |

◁◁ ◀◀ Page [1] of 4 ▶▶ ▷▷ 10 ▼

◯ Reset Sort Order    34 Records    View 1-10 of 34

| | Form Name | Status | Created By | Shared | Date Created |
|---|---|---|---|---|---|
| ☐ | BASC-3 Custom Flex Flex Demo | Inactive | | No | |
| ☐ | BASC-3 Custom Flex Teacher Age 6-11 | Active | | No | |
| ☐ | BASC-3 Custom Flex Flex Demo | Active | | No | |
| ☐ | BASC-3 Custom Flex Flex Demo Form | Active | | No | |
| ☐ | BASC-3 Custom Flex Flex Parent Age 6-11 Trial | Active | | No | |
| ☐ | BASC-3 Custom Flex Flex Teacher Age 6-11 | Active | | Yes | |
| ☐ | BASC-3 Standard Flex Self-report, Adolescent, Int Prob | Active | | Yes | |
| ☐ | BASC-3 Standard Flex Self-report, Child, Int Prob | Active | | Yes | |
| ☐ | BASC-3 Standard Flex Self-report, Adolescent, School Problems | Active | | Yes | |
| ☐ | BASC-3 Standard Flex Self-report, Child, School Problems | Active | | Yes | |

◁◁ ◀◀ Page [1] of 4 ▶▶ ▷▷ 10 ▼    View 1-10 of 34

← Back

1 Select a Rater
2 Select one or more Age Groups
3 Drag items from the Item Bank (left) to the Custom Form (right)
4 Select a Scoring Direction and click Compute Reliability
5 Give the new form a name and indicate if it will be shared
6 Click Save & Publish Rater: ⦿ Parent
○ Teacher
○ Self Age Group: ☐ Ages 2-6
☑ Ages 6-11
☑ Ages 12-18

☐ Show only favorites

Filter items by scale

Item Bank
☆ Acts in a safe manner.
   Activities of Daily Living, Adaptive Skills
☆ Needs to be reminded to brush teeth.
   Activities of Daily Living, Adaptive Skills
☆ Sets realistic goals.
   Activities of Daily Living, Adaptive Skills
☆ Volunteers to help clean up around the house.
   Activities of Daily Living, Adaptive Skills
☆ Organizes chores or other tasks well.
   Activities of Daily Living, Adaptive Skills Custom Form Drag items here Questions on this form: 0 of between 5 up to 45

[Compute Reliability]

Scoring Direction:
○ High score indicates a desirable level of functioning
⦿ Low score indicates a desirable level of functioning 860, 862, 864, 866

Mem Bank

☆ Is careless with belongings.
  Activities of Daily Living, Adaptive Skills

☆ Volunteers to help clean up around the house.
  Activities of Daily Living, Adaptive Skills ☆ Uses others for personal gain.
  Aggression, Externalizing Problems ☆ Gets angry easily.
  Anger Control ☆ Uses bad language when angry.
  Anger Control

Custom Form — 860

☆ Acts in a safe manner
  Activities of Daily Living, Adaptive Skills

☆ Sets realistic goals
  Activities of Daily Living, Adaptive Skills

☆ Needs to be reminded to brush teeth
  Activities of Daily Living, Adaptive Skills ☆ Teases others.
  Aggressive, Externalizing Problems ☆ Adjusts well to changes in routine.
  Adaptability, Adaptive Skills Questions on this form: 36 of between 5 up to 45

Scoring Direction:
○ High score indicates a desirable level of functioning
◉ Low score indicates a desirable level of functioning

[Compute Reliability] — 870

Coefficient Alpha Reliabilities, General Combined Norm Samples

| Age 2-3 | — |
|---|---|
| Age 4-5 | — |
| Age 6-7 | 0.94 |
| Age 8-11 | 0.92 |
| Age 12-14 | 0.93 |
| Age 15-18 | 0.93 |

— 872

Form Name:
BASC-3 Custom Flex_Parent Age 12-18 and Age 6-11 — 876
○ Share this form with other users on your account

[Save Draft] [Save & Publish] — 874

FIG. 13

RELIABILITY BASED DYNAMIC CONTENT RECOMMENDATION

CROSS-REFERENCES TO RELATED APPLICATIONS

This application is a continuation of U.S. application Ser. No. 15/490,733, filed on Apr. 18, 2017, and entitled "SYSTEMS AND METHODS FOR AUTOMATIC CONTENT REMEDIATION NOTIFICATION", which claims the benefit of U.S. Provisional Application No. 62/443,221, filed on Jan. 6, 2017, and entitled "SYSTEMS AND METHODS FOR AUTOMATIC CONTENT REMEDIATION NOTIFICATION", the entirety of which is hereby incorporated by reference herein.

BACKGROUND

A computer network or data network is a telecommunications network that allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology, and organizational intent. In most cases, communications protocols are layered on (i.e. work using) other more specific or more general communications protocols, except for the physical layer that directly deals with the transmission media.

Notifications can be sent through a computer network. These notifications can be electronic notification and can be receive via e-mail, phone, text message, or fax. Notifications have many applications for businesses, governments, schools, and individuals.

BRIEF SUMMARY

One aspect of the present disclosure relates to a system for automatic content remediation notification. The system includes memory that can include a content library database that includes a plurality of data packets and metadata associated with each of the data packets, which metadata identifies at least one attribute of the associated data packet. The system includes a first user device including a first network interface that can exchange data via a communication network and a first I/O subsystem that can convert electrical signals to user interpretable outputs via a user interface. The system can include a second user device and one or more servers. In some embodiments, the one or more servers can: receive a content aggregation creation request from the first user device; identify content information associated with a set of the plurality of data packets in response to the receipt of the content aggregation creation request; apply a filter request to the set of the plurality of data packets to form a restricted set of data; automatically provide information relating to data packets in the restricted set of data packets to the first user device; receive content aggregate information identifying a content aggregate from the first user device, which content aggregate includes a plurality of data packets from the restricted set of data packets; evaluate the content aggregate according to the metadata associated with the data packets of the content aggregate; and automatically output an indicator of the evaluation result to the first user device.

In some embodiments, the one or more servers can receive a filter request from the first user device, which filter request identifies at least one attribute as a criterion for inclusion of a data packet within the restricted set of data packets. In some embodiments, the filter request identifies an intended recipient of the content aggregate. In some embodiments, the identification of the intended recipient of the content aggregate includes identification of one or more attributes of the intended recipient of the content aggregate.

In some embodiments, applying the filter request to the set of the plurality of data packets includes identifying a norm group for the intended recipient. In some embodiments, the norm group comprises includes data previously gathered from users similar to the intended recipient. In some embodiments, evaluating the content aggregate includes automatically generating a reliability value based on the metadata of the data packets in the content aggregate. In some embodiments, the reliability value can be Cronbach's α. In some embodiments is generated for at least one age group.

In some embodiments, evaluating the content aggregate further includes generating supplemental statistical parameters from the norm group data. In some embodiments, the supplemental statistical parameters include a mean and a standard deviation. In some embodiments, evaluating the content aggregate further includes: generating a content score; comparing the content score to a threshold, which threshold delineates between acceptable and unacceptable content scores; and generating a compliance recommendation when the comparing of the content score to the threshold indicates that the content score is unacceptable. In some embodiments, the compliance recommendation identifies at least one data packet for inclusion in the content aggregation. In some embodiments automatically outputting the indicator of the evaluation result includes automatically sending the compliance recommendation to the first user device.

One aspect of the present disclosure relates to a method for automatic content remediation notification. The method includes: receiving a content aggregation creation request from the first user device; identifying content information associated with a set of the plurality of data packets in response to the receipt of the content aggregation creation request; applying a filter request to the set of the plurality of data packets to form a restricted set of data; automatically providing information relating to data packets in the restricted set of data packets to the first user device; receiving content aggregate information identifying a content aggregate from the first user device, which content aggregate, also referred to herein as a content aggregation, includes a plurality of data packets from the restricted set of data packets; evaluating the content aggregate according to the metadata associated with the data packets of the content aggregate; and automatically outputting an indicator of the evaluation result to the first user device.

In some embodiments, the method includes receiving a filter request from a first user device, which filter request identifies at least one attribute as a criterion for inclusion of a data packet within the restricted set of data packets, and which filter request identifies an intended recipient of the content aggregate. In some embodiments, the identification of the intended recipient of the content aggregate includes identification of one or more attributes of the intended recipient of the content aggregate, and applying the filter request to the set of the plurality of data packets includes identifying a norm group for the intended recipient, which norm group includes norm data previously gathered from users similar to the intended recipient.

In some embodiments, evaluating the content aggregate includes automatically generating a reliability value based on the metadata of the data packets in the content aggregate and generating supplemental statistical parameters from the norm group data. In some embodiments, evaluating the content aggregate further includes: generating a content score; comparing the content score to a threshold, which threshold delineates between acceptable and unacceptable content scores; and generating a compliance recommendation when the comparing of the content score to the threshold indicates that the content score is unacceptable. In some embodiments, the compliance recommendation identifies at least one data packet for inclusion in the content aggregation, and automatically outputting the indicator of the evaluation result includes automatically sending the compliance recommendation to the first user device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 9 is a swim lane diagram of one embodiment of a process for content aggregation creation.

FIG. 10 is a schematic illustration of one embodiment of a management interface.

FIG. 11 is a schematic illustration of one embodiment of a form builder user interface.

FIG. 12 is a schematic illustration of one embodiment of the form builder user interface in which content components have been added to the form.

FIG. 13 is a schematic illustration of one embodiment of the form builder user interface in which scoring is being performed.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
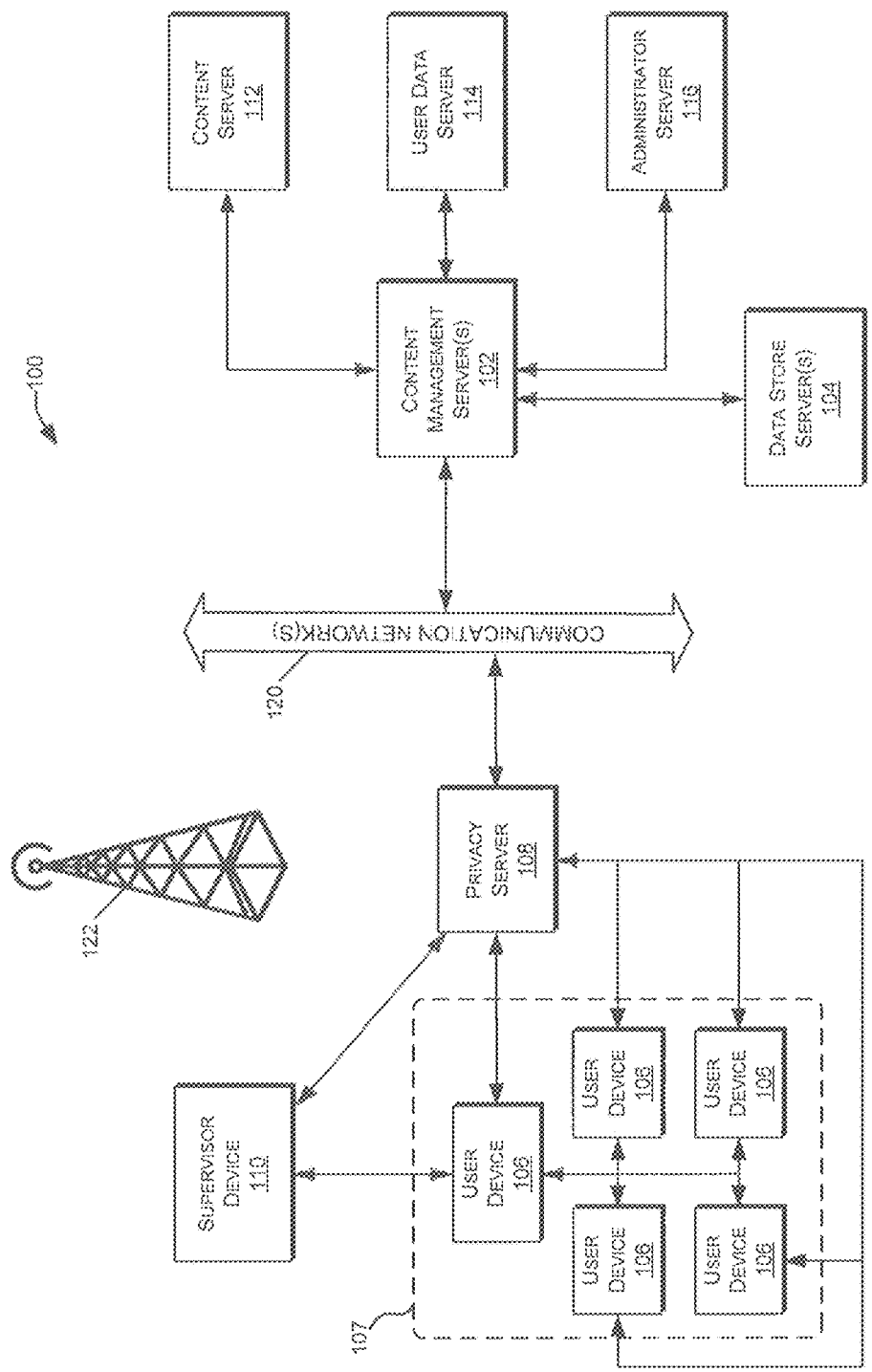
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
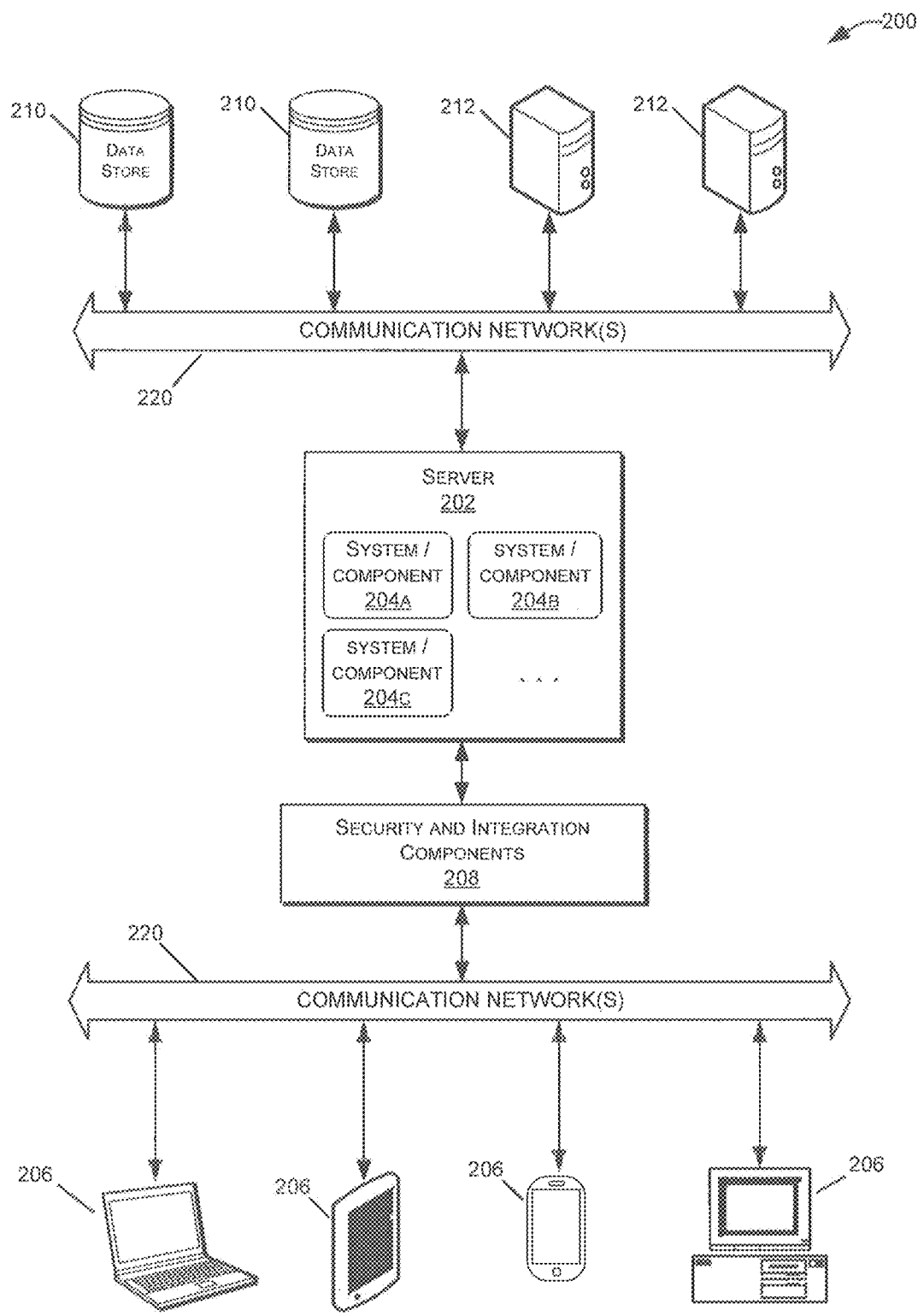
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
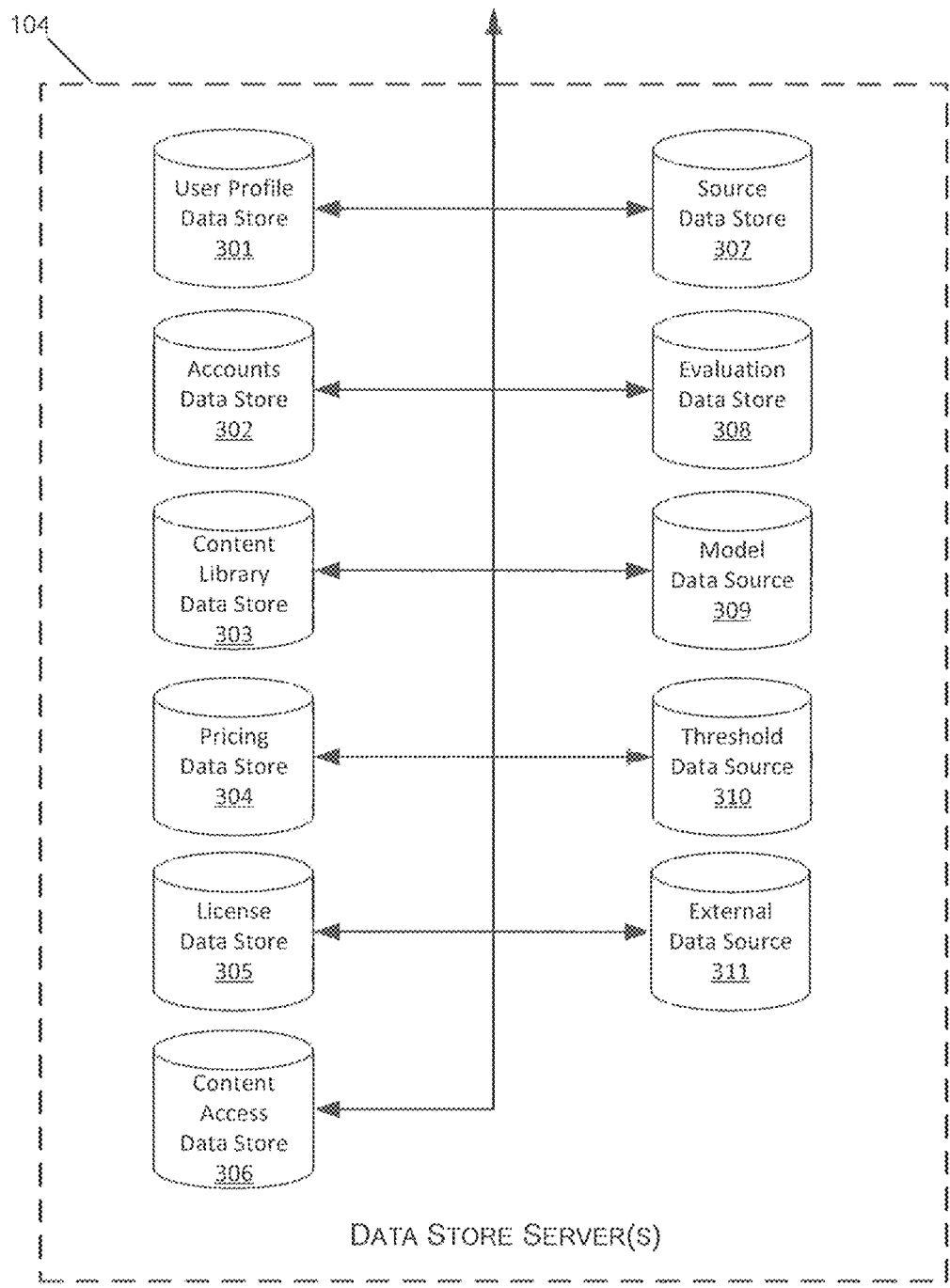
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library database 303 can include a plurality of content components. The content components can, in some embodiments, comprise one or several tasks, questions, activities, or the like that can be combined together to create a single piece of content, also referred to herein as a content aggregation or form, such as, for example, a single assignment, quiz, test, or evaluation. In some embodiments, these single content components can be each associated with information. This information can be generated from user interaction with the content of the single components. In some embodiments, this information can, for example, characterize a reliability of the single item, a difficult of the single item, a differentiation of the single item, one or several averages of the single item, one or several standard deviations of the single item, or the like. In some embodiments, the differentiation of the single item can characterize the degree to which correctly or incorrectly responding to the item delineates between skill levels, attribute levels, or the like. In some embodiments, information associated with single items can be used to determine a reliability of a combination of multiple items.

In some embodiments, the content library database 303 can comprise one or several forms that can each include a plurality content components. In some embodiments, these forms can be created by a user of the CDN 100 from the content components stored in the content library database 303. In some embodiments, some or all of these one or several forms can be characterized by, for example, one or several scores or statistical measures. These scores or statistical measures can include a reliability coefficient such as, for example, a Cronbach's $\alpha$, an error score or value such as, for example, a standard error of measurement (SEM) score, or the like. In some embodiments, one or several of these scores can be calculated based on the information associated with each of the content components. In some embodiments, these one or several scores of the form can be calculated in real-time and in some embodiments, one or several scores for alternative forms can be calculated to allow the recommendation of one or several content components for inclusion in the form and/or for removal from the form. In some embodiments, these one or several scores can vary based on one or several attributes of the intended recipient and/or recipients of the form. These one or several attributes can include, for example, gender, age, education, intelligence, or the like.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network are content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion status can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
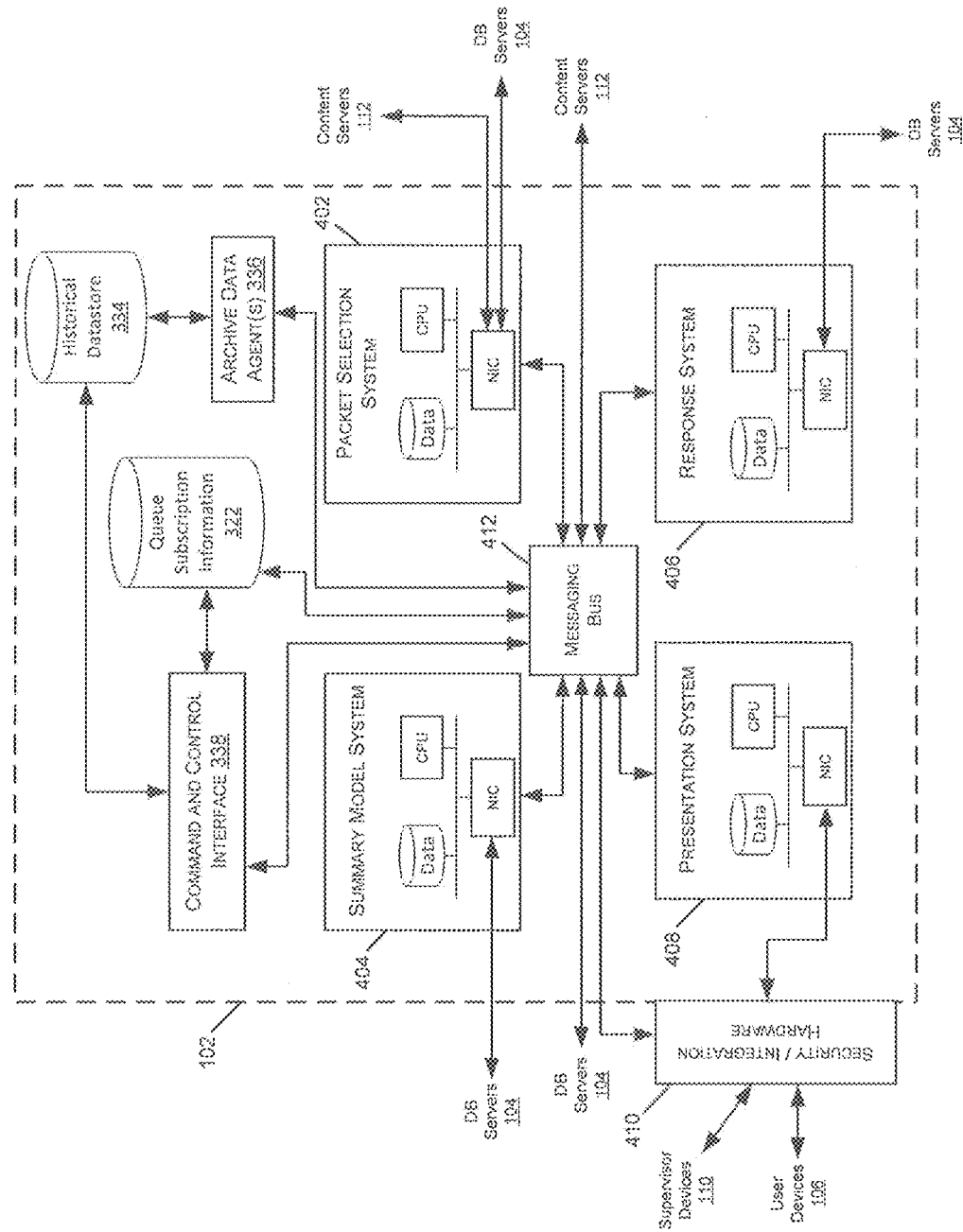
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; form reliability, content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can optionally allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. In some embodiments, the internal processing subscriber 402-408 can receive a request for creation of a form, receive filter inputs from the user, provide content components corresponding to the filter inputs to the user, receive selections of content components for inclusion in the form, calculate a reliability of the form, generate recommended changes to the form, store the form, provide the form to a user, receive responses to the provided form, evaluate the responses, generate a score characterizing the received response, updating information relevant to the user, generating and providing an intervention or intervention recommendation, and providing the updated information relevant to the user.

The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets or content components, for providing to a user. In some embodiments, the recommendation engine can identify one or several content components for removal from a form and/or one or several content components for inclusion in a form. In some embodiments, these on or several content components can be identified based on their impact on the one or several scores or statistical measures characterizing the form.

In some embodiments, for example, the reliability of a form may be too low as compared to a threshold value. In such an embodiment, one or several content components in the form that are responsible for decreasing the reliability of the form can be identified for removal from the form and/or can be removed from the form. Similarly, in some embodiments in which the reliability is too low, one or several content components that are not in the form can be identified for inclusion in the form and/or can be included in the form. In some embodiments, one or several content components identified for inclusion in the form and/or identified for removal from the form can be identified to the creator of the form for confirmation of the removal of those one or several content components from the form and/or for the confirmation of the addition of those one or several content components to the form.

These content components can be selected based on, for example, the information retrieved from the database server 104 including, for example, the user profile database 301, the content library database 303, the model database 309, or the like. In some embodiments, these one or several data packets can be adaptively selected and/or selected according to one or several selection rules, to the determine reliability of a form or draft form, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like. In some embodiments, the summary model system 404 can generate a model, based on user response data, identifying a user's progress over time in developing a skill, an attribute, or the like. In some embodiments, this can include receiving a raw score generated by, for example, the response system 406 (discussed below), and generating a standardized score from that raw score. In some embodiments, for example, this can include the generation of a T-score from the raw score. In some embodiments, the T-score can be a standardized score that is positive and that has a mean of 50. In some embodiments, the T-score can characterize the number of standard deviations a raw score is above or below a mean. In some embodiments, the T-score can be used to standardize for age, gender, or any other attribute.

A content management server 102 also may include an response system 406, which can include, in some embodiments, a response processor. The response system 406 may be implemented using dedicated hardware within the content distribution network 100 (e.g., a response server 406), or using designated hardware and software resources within a shared content management server 102.

The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100.

The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
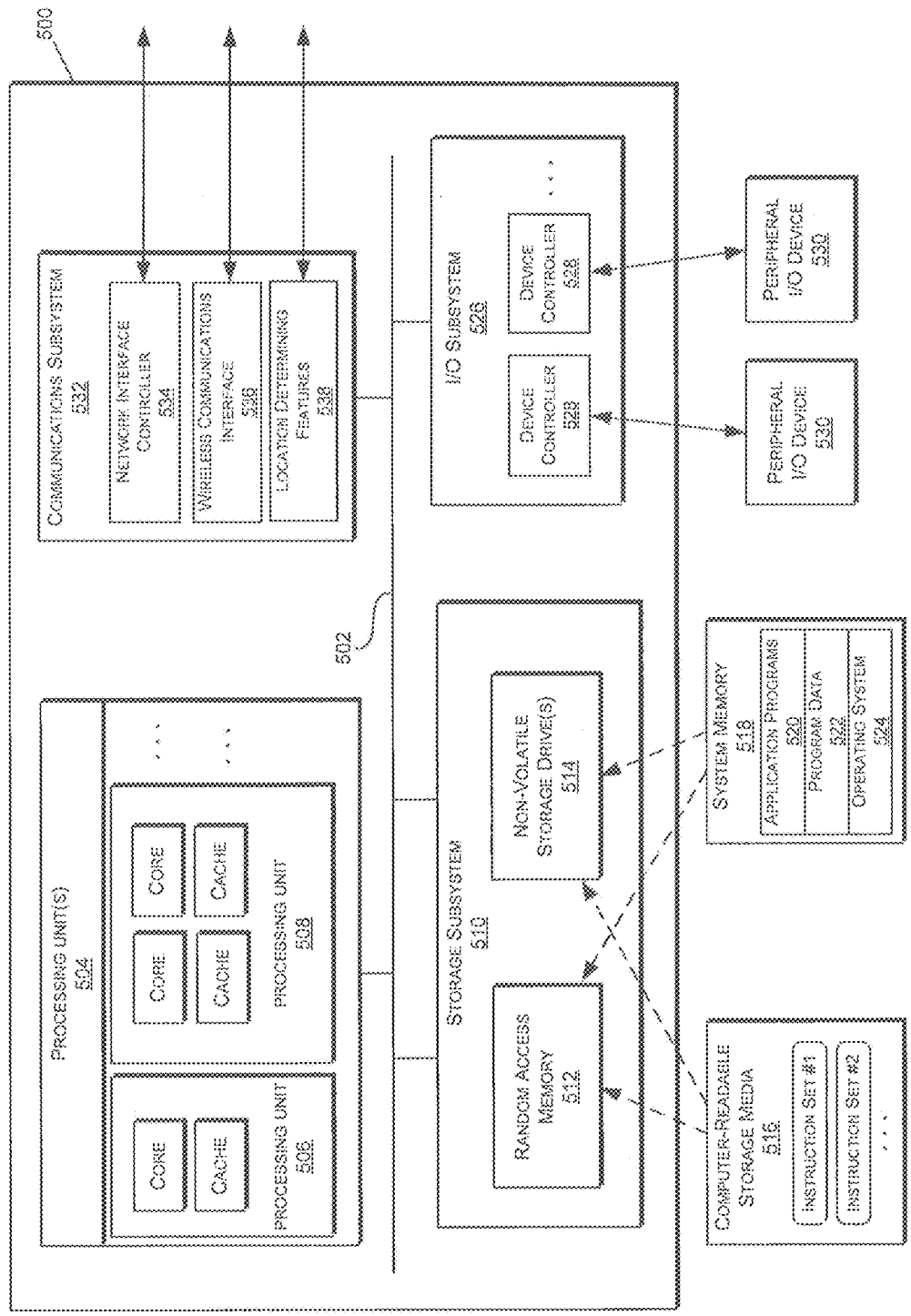
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in nonvolatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
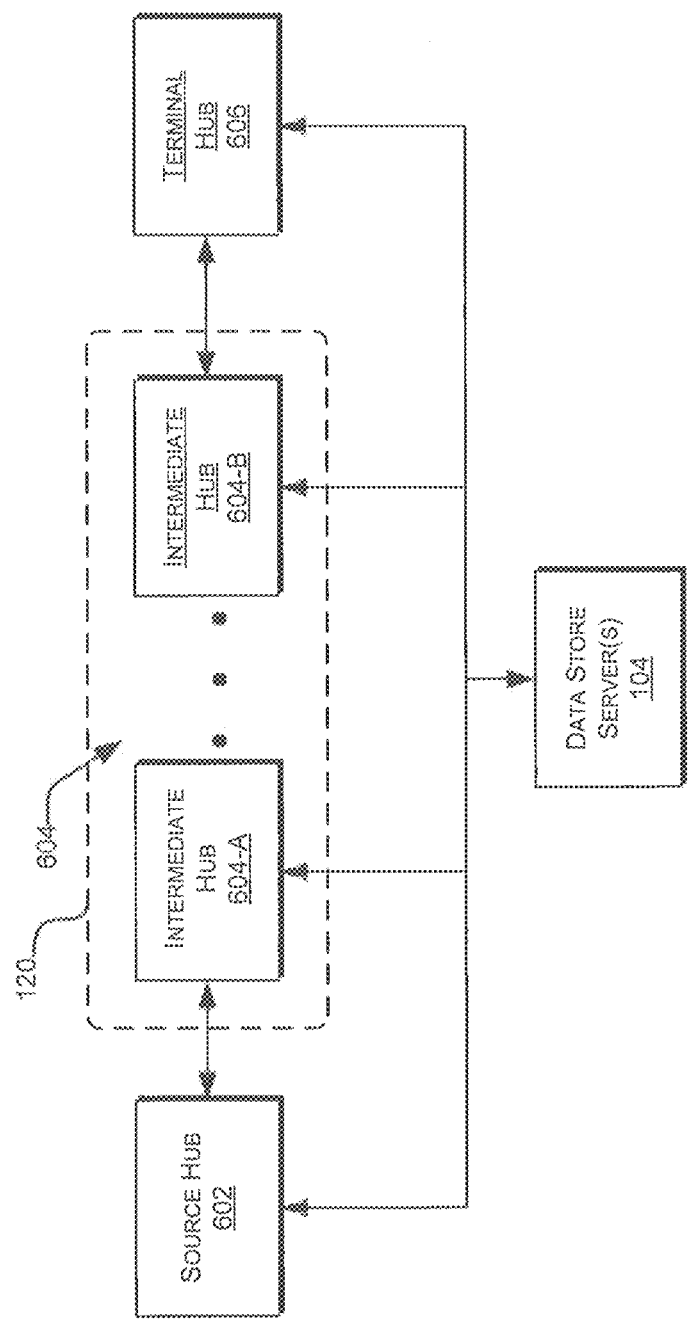
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
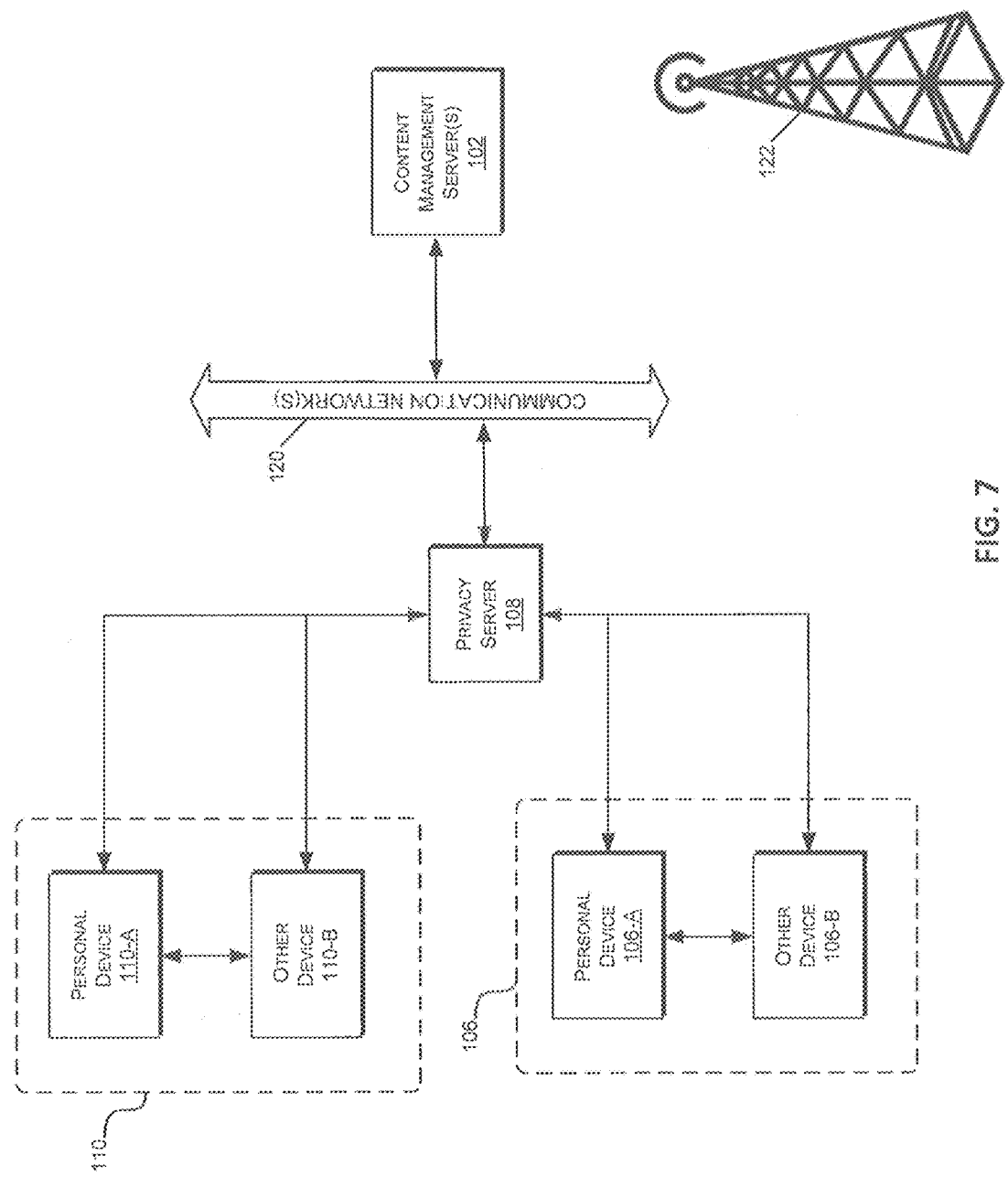
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert. In some embodiments, the prompt can comprise an alert configured to trigger activation of the I/O subsystem of a user device 106 of a follow-up user, also referred to herein as a second user device, to provide a notification of the exceeded threshold In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
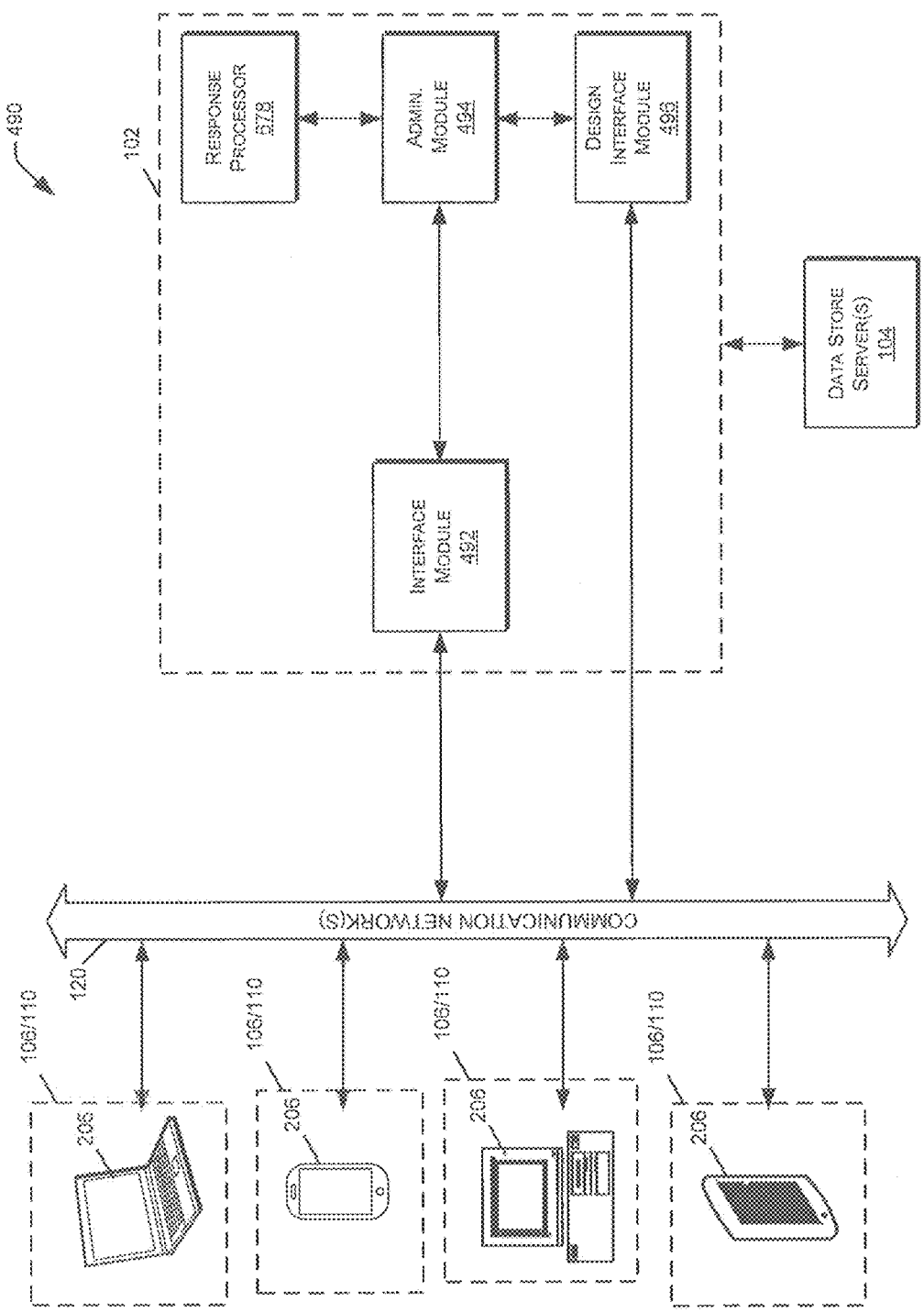
FIG. 8 is a schematic illustration of one embodiment of an automatic content remediation notification system.

With reference now to FIG. 8, a schematic illustration of one embodiment of an automatic content remediation notification system 490 is shown. The automatic content remediation notification system 490 can comprise some or all of the components of the content distribution network 100 including, for example, one or several servers 102, the data store server 104, one or several user devices 106, one or several supervisor devices 110, and/or the communication network 120. In some embodiments, the user devices 106 and/or supervisor devices 110 can be one or several client computing devices 206 as indicated in FIG. 8.

In some embodiments, the automatic content remediation notification system 490 can further include one or several modules that can be embodied in hardware or software, including, for example, an interface module 492, an administrator module 494, a design interface module 496, the response processor 678, and/or the database server 104. In some embodiments, some or all of the interface module 492, the administrator module 494, the design interface module 496, and the response processor 678 can be one or several hardware modules separate from the one or several servers 102 and/or one or several software modules that can be implemented on the one or several servers 102 or on other hardware.

The automatic content remediation notification system 490 can, in some embodiments, be used by the user of the supervisor device 110 to create and/or author content such as one or several data packets, to create one or several content aggregates which can each comprise one or several data packets, to assign one or several content aggregates to a user, which user is referred to herein as the assigned user or the recipient user, to provide the one or several data packets to the assigned user, and to receive any responses from the assigned user. In some embodiments, some or all of the content aggregations can be evaluations such as, for example, psychometric evaluations. In some embodiments, these evaluations can evaluate one or several psychological states or problems, one or several behavior types, or the like.

In some embodiments, the automatic content remediation notification system 490 can be further configured to automatically generate a content score for a created content aggregation. In some embodiments, the content score can comprise a reliability value that can indicate the reliability of any outcome generated in response to a user's completion of the content aggregation, and that can specifically identify the expected overall consistency of the content aggregation in repeatedly generating the same results under the same conditions. In some embodiments, the reliability value can be based on metadata of the data packets forming the content aggregate. This reliability value can be, in some embodiments, Cronbach's α, and, in some embodiments, this reliability value can be generate for an age group of the recipient user and/or for several age groups. Thus, in some embodiments, a first reliability of a content aggregation can be calculated for a first age group, a second reliability of the content aggregation can be calculated for a second age group, a third reliability of the content aggregation can be calculated for a third age group, etc.

In some embodiments, the automatic content remediation notification system 490 can be further configured to identify a norm group based on the recipient user. The norm group can be a group of a plurality of similar users who have already completed the content aggregations and/or some or all of the data packets associated with the content aggregation. In some embodiments, the norm group can include norm data previously gathered from the plurality of similar users to the intended recipient.

In some embodiments, the norm group and/or the norm data can be used in generating one or several additional statistical parameters, also referred to herein as supplemental statistical parameters that can be used in evaluating the one or several responses to the content aggregation. These additional statistical parameters can be calculated from the norm data and can include, for example, a mean, a median, a mode, a deviation measure, and/or a standard deviation.

In some embodiments, the automatic content remediation notification system 490 can be further configured to track the amount of time elapsed since the sending of one or several content aggregations to a user and to compare the lapsed time to one or several thresholds to determine whether to provide a remediation and/or prompt to the assigned user and/or to a follow-up user. As used herein a follow-up user is the user associated with the recipient user but who is not the recipient user. In some embodiments, the follow-up user can have some responsibility vis-à-vis the recipient user for completion of one or several activities associated with one or several data packets. The follow-up user can include, for example, a parent, guardian, tutor, assistant, trainer, facilitator, or the like.

In some embodiments, the automatic content remediation notification system 490 can be configured to automatically generate and send a prompt to at least the follow-up user when the lapsed time exceeds one or several thresholds. In some embodiments, this prompt can comprise an alert the receipt of which alert can result in the launching of an application within the receiving device, and in some embodiments, the alert can include a link that, when selected, launches the application or navigates a web-browser of the device of the selector of the link to page or portal associated with the alert. In some embodiments, this alert can comprise data relating to the provided data packet and/or activity, the amount of lapsed time since receipt of the data packet and/or activity, reward information, the medial information, or the like.

In some embodiments, the automatic content remediation notification system 490 can be configured to receive a response to the provided content aggregation and evaluate the response. In some embodiments, and as a result of the evaluation, the automatic content remediation notification system 490 can be configured to update user data relating to the recipient user and/or generate a provide a report based on the updated user data. In some embodiments, and as a result of the evaluation, the automatic content remediation notification system 490 can be configured to generate a remediation, which remediation can be automatically generated and/or delivered to the recipient user, the follow-up user, and/or the user of the supervisor device 110. In some embodiments, the remediation can comprise an alert that can be generated and sent to the recipient user, the follow-up user, and/or the user of the supervisor device 110 via the communications network 120. In some embodiments, the alert can include a link that, when selected, launches the application or navigates a web-browser of the device of the selector of the link to page or portal associated with the alert.

The interface module 492 can be configured to interact with the user device 106 and/or the supervisor device 110 to deliver one or several content aggregations to the user and/or to facilitate in the creation of one or several content aggregations. In some embodiments, the interface module 492 can be configured to generate and/or control one or several user interfaces on the user device and/or the supervisor device 110.

In some embodiments, the administrator module 494 can be configured to send information and/or signals to, and receive information and/or signals from the other components of the automatic content remediation notification system 490. In some embodiments, the administrator module can coordinate the operation of other components of the automatic content remediation notification system 490 and/or control communication between the other components of the automatic content remediation notification system 490.

The administrator module 494 can communicate and/or direct communication with the supervisor device 110 for the creation of content and/or data packets which can then be stored in the database server 104. The administrator module 494 can further communicate and/or direct communication with the supervisor device 110 for the generation and/or selection of a content aggregation for providing to the recipient user via a user device 106 associated and/or owned or controlled by the recipient user. The administrator module 494 can then send the selected content aggregation to the user device 106 of the recipient user via the communication network 120.

The administrator module 494 can trigger a timer to measure lapsed time since the sending of the content aggregation to the recipient user. The administrator module can further compare the timer to one or several thresholds to determine whether to generate and/or send a remediation and/or prompt to the recipient user, the follow-up user, and/or the user the supervisor device 110. If the administrator module 494 determines to generate and/or send a prompt and/or remediation, the administrator module 494 can direct the sending of such a prompt and/or remediation. This prompt and/or remediation can be sent via a notification system and/or service such as, for example, Apple Push Notification Service, Amazon Simple Notification Service, Android Cloud to Device Messaging, Google Cloud Messaging, or the like. In some embodiments, this notification can be a push notification.

The administrator module 494 can receive a response from recipient user via the user device 106, which response can be to the content aggregation provided to the recipient user. The administrator module 494 can provide the response to the response processor 678 which can evaluate the response to determine whether the response is correct or incorrect and/or the degree to which the response is correct or incorrect. In some embodiments, the data packet can comprise an activity relating to speech therapy, also referred to herein as oral training, in the response can comprise, for example, a video and/or audio file of the recipient user performing the activity. In some embodiments, this can include video and/or audio file of the recipient user saying one or several letters, sounds, words, or the like. In some embodiments, the response processor 678 can compare the response to a model response that can be received from the content library database 303 in the database server 104.

The response processor 678 can generate a report indicating the result of the evaluation of the received response and can provide this report to the administrator module 494. In some embodiments, this report can identify the outcome of the evaluation of the received response and/or provide tracking of any progress made by the user over time with respect to one or several traits, behaviors, or the like. Based on the received report, the administrator module 494 can determine whether remediation is desired, and can provide a remediation when the remediation is desired.

The automatic content remediation notification system 490 can include a design interface module 496. The design interface module 496 can be in communication with one or several supervisor devices 110 which can be one or several client computing devices 206 as indicated in FIG. 8. In some embodiments, the user of the supervisor device 100 can interact with the design interface module 494 to create one or several content aggregations. In some embodiments, the design interface module can further communicate with the packet selection system 402 to facilitate in the recommendation of one or several content components for inclusion in the content aggregation and/or the recommendation of one or several content components for removal from the content aggregation.

With reference now to FIG. 9, a swim lane diagram of one embodiment of a process 700 for content aggregation creation is shown. The process 700 can be performed by all or portions of the content distribution network 100 and specifically by all or portions of the automatic content remediation notification system 490. The process 700 begins at block 702, wherein a creation input is received by the supervisor device 110 from the user of the supervisor device 110 via the I/O subsystem 526 of the supervisor device 100. In some embodiments the creation request can include data identifying the user of the supervisor device 110, identifying the intended recipient of the content aggregation, or the like.

In some embodiments, the creation input can be received via a management interface 850 as shown in FIG. 10. The management interface can include a display panel 852 that display information relating to existing forms including, for example, a form name, a form status, an identifier of the form creator, whether the form is shared, and the date the form is created. The management interface 850 further includes a creation button 854. In some embodiments, activation of the creation button 854 can result in the receipt of the creation input by the supervisor device 110.

After the creation input has been received, the process 700 proceeds to block 704, wherein a creation request is generated and/or sent by the supervisor device 110. In some embodiments, the creation request comprises a communication, and specifically an electrical communication containing data identifying a request for content aggregation creation. In some embodiments, the creation request can be generated and/or sent as a consequence of the receipt of the creation input. In some embodiments, the supervisor device 110 can generate this request and can send this request to the interface module 492 and/or the design interface module 494 via the communication network 120. After the creation request has been generated and sent, the process 700 proceeds to block 706, wherein the creation request is received by the interface module 492 and/or by the design interface module 494. The receipt of the creation request can result in the automatic triggering of the launching of an application, such as a form application, through which the content aggregation can be created. In some embodiments, the form application can provide one or several software tools and/or capabilities to facilitate the creation of the content aggregation. The form application can be a software module that can be located on the interface module 494, the administrator module 494, and/or the design interface module 494.

In some embodiments, the launching of the form application can include the generating and sending of one or several signals to the supervisor device 110 directing the supervisor device 110 to, as indicated in block 710 of FIG. 7, launch a user interface, also referred to herein as a form builder user interface (U/I) which can facilitate the creation of the content aggregation. The receipt of these one or several signals can result in the launching of the form builder user interface by the supervisor device 110, and specifically by the I/O subsystem 526.

One embodiment of the form builder user interface 860 is shown in FIG. 11. The form builder user interface 860 can include a filter panel 862. In some embodiments, the filter panel 862 can include one or several features that are manipulable to provide one or several filter inputs. In some embodiments, these filter inputs can identify a rater, one or several age groups, a test category or test type, or the like. The form builder user interface 860 can include a content component display window 864, also referred to herein as an item bank window 864 or item bank 864. In some embodiments, the content component display window 864 can display one or several content components that match the filter inputs. In some embodiments, the display of one or several of the content components can include the display of unique information for each of the displayed content components. This information can include, for example, a name or subject of the content component.

Figure 12:
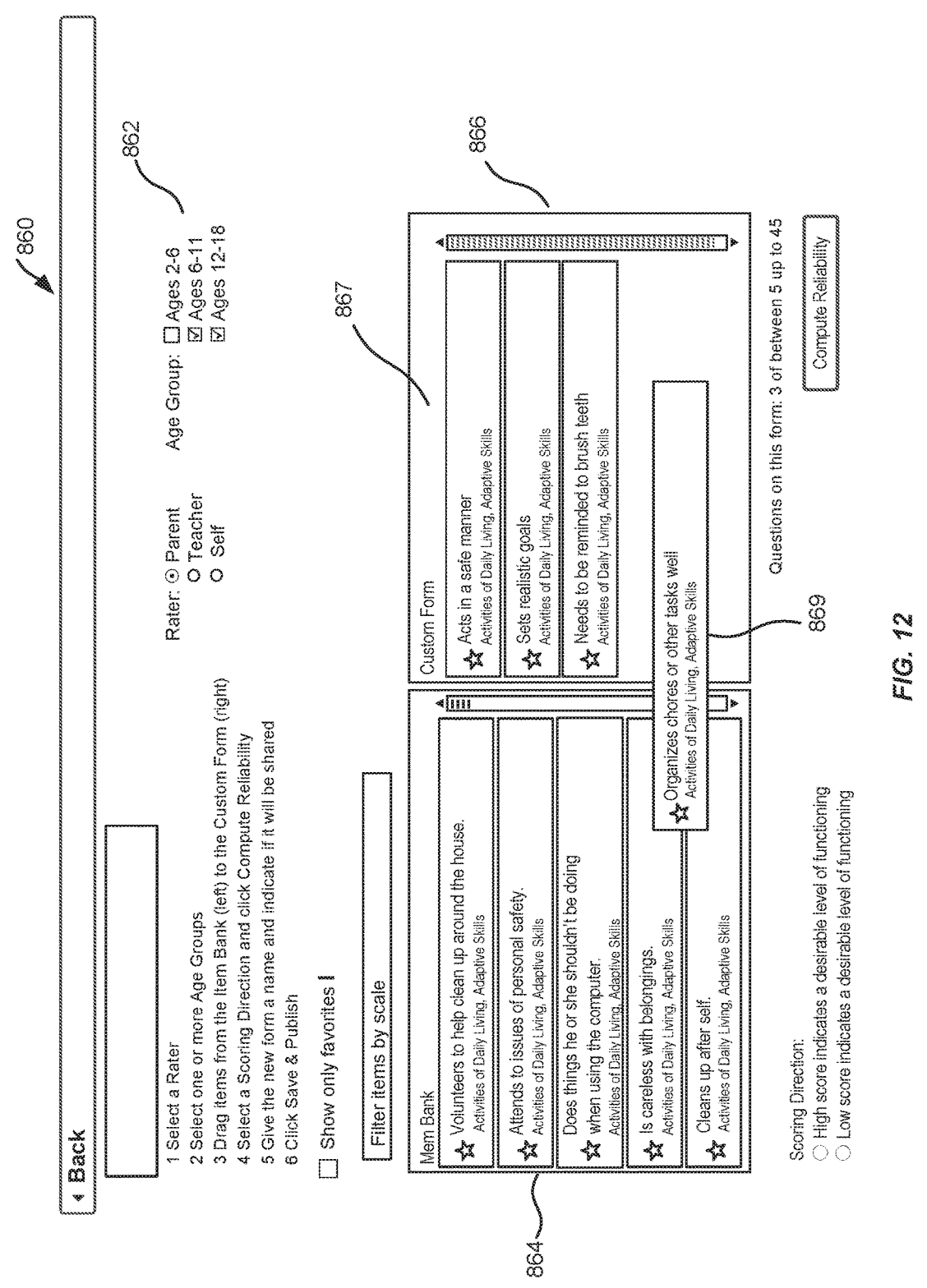

The form builder user interface 860 can include a custom form window 866, also referred to herein as a custom form display 866. The custom form display 866 can identify content components for inclusion in the form that is being created. In some embodiments, the custom form display can comprise a window in which the user may drag-and-drop content components selected and/or dragged from the item bank window 864. FIG. 12 shows one embodiment of the form builder user interface 860 wherein a content components 867 have already been added to the form and are thus displayed in the custom form display 866, and wherein a content component 869 is being dragged to the custom form display 866 for adding to the form. In some embodiments, the form builder user interface 860 can track the number of content components in the custom form display and can indicate this number to the user. In some embodiments, a recommended number of content components can be displayed, for example, next to the custom form display 866. In some embodiments, for example, a custom form can include between 5 and 45 content components.

After the launch of the user interface, the process 700 proceeds to block 712 wherein filter inputs are received. In some embodiments, the filter inputs can be received via the one or several features of the filter panel 862. The filter components can specify one or several parameters that can be used to select data packets for potential inclusion in the content aggregation. In some embodiments these filter inputs can, for example, specify a difficulty level, a content, relevance to a topic, content, relevance to a behavior, or the like. In some embodiments, these filter inputs can specify one or several attributes relevant to the intended recipient such as an age, gender, race, ethnicity, language, education level, or the like. The filter inputs can be received by the supervisor device 110 via the I/O subsystem 526 of the supervisor device 110.

After the filter inputs have been received, the process 700 proceeds to block 714, wherein filter requests are generated and/or sent. In some embodiments, the filter requests can comprise one or several electrical signals that can be generated by the supervisor device 110 based on the received filter inputs. The filter requests can be sent by the supervisor device 110 to the one or several servers 102, and specifically to the interface module 492 and/or the design interface module 496. The filter requests can be received by the interface module 492 and/or the design interface module 496 as indicated in block 716 of process 700, and the relevant content can then be retrieved and/or identified based on the received filter requests. In some embodiments, the relevant content can comprise one or several data packets complying with the filter requests. In some embodiments, the retrieving the relevant data packets can include querying the database server 104, and specifically the content library database 303 for data packets meeting the requirements of the filter requests. In some embodiments, this can include filtering the data packets in the content library database 303.

After the relevant data packets have been retrieved, the process 700 proceeds to block 722, wherein one or several potential acceptable combinations are identified. In some embodiments, this can include identifying one or several combinations of the relevant data packets that can be combined into a packet aggregation and that would meet reliability requirements and/or standards. In some embodiments, this can include the identification of one or several potential groupings of content, the automatic generation of a reliability coefficient, also referred to herein as a reliability score, for each of these potential groupings, the comparison of these reliability coefficients to a threshold value, and the identification of a potential grouping as acceptable when the reliability coefficient for that potential grouping exceeds the threshold value. In some embodiments, the identification of potential acceptable combinations can be performed by the response processor 678.

After the potential acceptable combinations have been identified, the process 700 proceeds to block 724, wherein the filtered content, or in other words, wherein the relevant content is provided. In some embodiments, this can include the providing of the data packets to the supervisor device 110 via the communication network 120 and in some embodiments, this can include the providing of data relating to the relevant data packets to the supervisor device via the communication network 120.

The filtered content is received by the supervisor device, and content selections can be received by the supervisor device 110 as indicated in block 726 of FIG. 9. Specifically, in some embodiments, the filtered content can be received and can be provided to the user of the supervisor device 110 via, for example, the component display window 864. In some embodiments, the content selection can include the receipt of one or several inputs from the user identifying one or several data packets from the set of filtered content for inclusion in a content aggregation. In some embodiments, this can include the dragging and dropping of one or several content components from the component display window 864 to the custom form display 866. In some embodiments, these selections can be received by the supervisor device 110 via the I/O subsystem 526 of the supervisor device 110.

After the content selections have been received, the process 700 proceeds to block 728, wherein a content aggregation is generated and/or sent. In some embodiments, the generation of the content aggregation can include the grouping of the selected data packets into the content aggregation. In some embodiments, the content aggregation can be generated by the supervisor device 110. In some embodiments, the content aggregation and/or data indicating the selected data packets can be sent from the supervisor device to the one or several servers 102 and/or to the interface module 492 and/or the design interface module 496. The content aggregation and/or the data identifying the selected data packets can be received by the interface module 492 and/or the design interface module 496 as indicated in block 730, and the content aggregation and/or the data packets forming the content aggregation can be provided to the response processor 678 for evaluation. In some embodiments, the generating and sending of the content aggregation can be performed in response to user manipulation of a scoring button 870 located in the form builder user interface 860 as shown in FIG. 13.

The content aggregation can be evaluated by the response processor 678 as indicated in block 732 of FIG. 9. In some embodiments, this can include the generation of one or several reliability coefficients for the content aggregation. These one or several reliability coefficients can be generated from metadata associated with the one or several data packets forming the content aggregation. This reliability coefficient can be, in some embodiments, Cronbach's α, and, in some embodiments, this reliability value can be generated for an age group of the recipient user and/or for several age groups. In some embodiments, the reliability coefficient can be sent to the supervisor device 110 and can be displayed to the user of the supervisor device 110 as a part of the form builder user interface 860. In some embodiments, the reliability coefficient can comprise a plurality of reliabilities that can be, for example, based on one or several attributes of the intended recipient of the form such as, for example, the age of the intended recipient of the form. In some embodiments, these reliabilities scores can be displayed in a reliability window 872 shown in FIG. 13.

After the content aggregation has been evaluated, the process 700 proceeds to decision state 734, wherein the reliability coefficient is compared to a threshold. In some embodiments, the threshold can delineate between acceptable reliability coefficients and unacceptable reliability coefficients. The threshold can be retrieved from the database server 104 and specifically from the threshold database 310. The response processor 678 can compare the reliability coefficient to the threshold to determine if the reliability coefficient is acceptable or unacceptable.

If it is determined that the reliability coefficient is acceptable, then the process 700 proceeds to block 736, wherein the content aggregation is stored. In some embodiments, the content aggregation can be stored via user interaction with the form builder user interface 860, and specifically with one or several save features 874 of the form builder user interface 860 as shown in FIG. 13. In some embodiments, for example, the save features 874 can comprise one or several save buttons, the manipulation of which can result in the storage of the content aggregation.

In some embodiments, the storing of the content aggregation can be performed in response to the receipt of a save request received via save controls located in the form builder user interface 860. In some embodiments, the content aggregation can be named via a user input in a name window 876, and the content aggregation can be stored in the database server 104, and specifically within the content library database 303 of the database server 104.

Returning again to decision state 734, if it is determined that the reliability coefficient is unacceptable, then the process 700 proceeds to block 738, wherein a compliance recommendation is generated and/or provided. In some embodiments, the compliance recommendation can comprise a recommendation for a change to the content aggregation. In some embodiments, this change can include the addition of one or several data packets to the content aggregation, the removal of one or several packets from the content aggregation, or the like. In some embodiments, the compliance recommendation can comprise a proposed change to the content aggregation, which change would result in an increase in the reliability coefficient and/or the meeting and/or exceeding of the threshold by the reliability coefficient when the content aggregation is modified according to the compliance recommendation. In some embodiments, the compliance recommendation can be generated by the response processor 678, the form application, and/or any other component or module of the content distribution network 100. The compliance recommendation can be provided to the supervisor device 110 by the form application, the interface module 492 and/or the design interface module 496.

After the compliance recommendation has been generated, the compliance recommendation can be provided to the supervisor device 110. In some embodiments, the compliance recommendation can be provided to the supervisor device 110 in the form of an alert that can be generated and sent to the supervisor device 110 via the communications network 120. In some embodiments, the alert can include a link that, when selected, launches the application or navigates a web-browser of the device of the selector of the link to page or portal associated with the alert. After the compliance recommendation has been generated and sent, the process 700 continues to block 726 and continues as outlined above.

Figure 14:
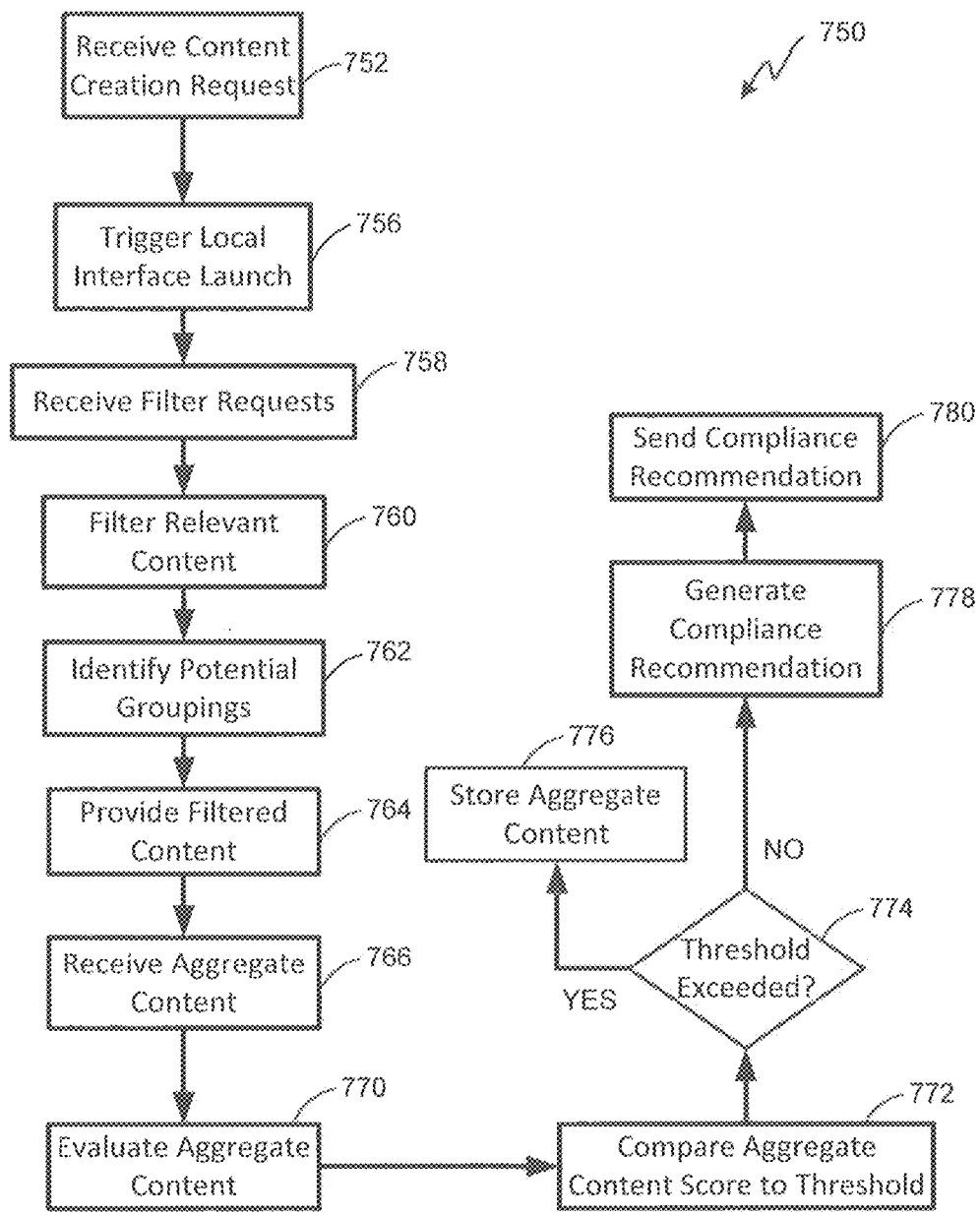
FIG. 14 is a flowchart illustrating one embodiment of a process for content aggregation creation.

With reference now to FIG. 14, a flowchart illustrating one embodiment of a process 750 for content aggregation creation is shown. The process 750 can be performed by all or portions of the content distribution network 100 and specifically by all or portions of the automatic content remediation notification system 490. The process 750 begins at block 752, wherein a content creation request is received. In some embodiments, the content creation request can be received by the interface module 492 and/or by the design interface module 494 from the supervisor device 110. The receipt of the creation request can result in the automatic triggering of the launching of an application, such as a form application, through which the content aggregation can be created. In some embodiments, the form application can provide one or several software tools and/or capabilities to facilitate the creation of the content aggregation. The form application can be a software module that can be located on the interface module 494, the administrator module 494, and/or the design interface module 494.

After the content creation request has been received, the process 750 proceeds to block 756, wherein one or several signals directing the supervisor device 110 to launch a user interface, also referred to herein as a form builder user interface (U/I), are generated and/or sent. In some embodiments, this trigger signal to cause the supervisor device 110 to launch the local interface can be generated and send by the one or several servers 102, and specifically by the interface module 492 and/or by the design interface module 494.

After the local interface launch has been triggered, the process 750 proceeds to block 758, wherein filter requests are received. In some embodiments, the filter requests can be received by the interface module 492 and/or the design interface module 496. In some embodiments, these filter requests can be received subsequent to the user providing of one or several filter inputs to the supervisor device 110.

After the filter requests have been received, the process 750 can proceed to block 760, wherein relevant content is filtered, retrieved, and/or identified. In some embodiments, relevant content can be filtered, retrieved, and/or identified based on the received filter requests. The relevant content can comprise one or several data packets complying with the filter requests. Retrieving the relevant data packets can, in some embodiments, include querying the database server 104, and specifically the content library database 303 for data packets meeting the requirements of the filter requests. In some embodiments, this can include filtering the data packets in and/or received from the content library database 303.

After the relevant content has been filtered, retrieved, and/or identified, the process 750 proceeds to block 762, wherein one or several potential groupings are identified. In some embodiments, this can include identifying one or several combinations of the relevant data packets that can be combined into a packet aggregation and that would meet reliability requirements and/or standards. In some embodiments, this can include the identification of one or several potential groupings of content, the automatic generation of a reliability coefficient for each of these potential groupings, the comparison of these reliability coefficients to a threshold value, and the identification of a potential grouping as acceptable when the reliability coefficient for that potential grouping exceeds the threshold value. In some embodiments, the identification of potential acceptable combinations can be performed by the response processor 678. In some embodiments, these potential groupings can be identified based in part on the received filter inputs. Specifically, in some embodiments, these potential grouping can be generated for topics, content, behaviors, or the like specified in received filter inputs. In some embodiments, these potential groupings can be provided to the user via the supervisor device 110, and the user can select one or several of these potential groupings for formation of the content aggregation. If such a grouping is selected, and if no additional content components are added to the content aggregation, then the process 750 can proceed to block 776 as discussed below.

After the potential groupings have been identified, the process 750 proceeds to block 764, wherein the filtered content is provided. In some embodiments, the filtered content can be provided to the supervisor device 110 by the one or several servers 102, the interface module 492 and/or the design interface module 496. In some embodiments, this can include the providing of the data packets to the supervisor device 110 via the communication network 120 and in some embodiments, this can include the providing of data relating to the relevant data packets to the supervisor device via the communication network 120.

After the filtered content has been provided, the process 750 proceeds to block 766, wherein the content aggregation and/or information identifying the data packets forming the content aggregation is received. In some embodiments, the content aggregation and/or the information identifying the data packets forming the content aggregation can be received by the one or several servers 102, the interface module 492 and/or the design interface module 496.

After the content aggregation has been received, the process 750 proceeds to block 770, wherein the content aggregation is evaluated. In some embodiments, this can include the generation of one or several content scores that can include, for example, one or several reliability coefficients for the content aggregation and/or one or several scores indicative of comprehensiveness of the content aggregation. In some embodiments, the reliability coefficient can characterize the expected repeatability of results generated by the content aggregation. This can include the expected repeatability of results generated by the content aggregation under the same or similar circumstances. A comprehensiveness score can identify the degree to which the content aggregation includes content components addressing all or portions of the topics, content, behaviors, or the like specified in received filter inputs.

The one or several reliability coefficients can be generated from metadata associated with the one or several data packets forming the content aggregation. This reliability coefficient can be, in some embodiments, Cronbach's $\alpha$, and, in some embodiments, this reliability value can be generate for an age group of the recipient user and/or for several age groups.

In some embodiments, for example, the generation of one or several reliability coefficients comprises: identifying the content components forming the content aggregation; retrieving data associated with the content components of the content aggregation; inputting the retrieved data into a reliability algorithm and/or equation; and outputting a reliability coefficient from the reliability algorithm and/or equation. In some embodiments, the reliability algorithm and/or equation can comprise an equation for calculation of Cronbach's $\alpha$.

In some embodiments, a single reliability coefficient can be calculated for the form, and in some embodiments, a plurality of reliability coefficients can be calculated for the form. In one embodiment, for example, a plurality of reliability coefficients can be calculated for the form based on variations of user attributes such as, for example, age, gender, language, education level, or the like. In some embodiments, a plurality of reliability coefficients can be calculated that can include, a reliability coefficient of the form and one or several reliability coefficients for portions of the form. In some embodiments, for example, the form may address a plurality of topics, behaviors, or the like. In such an embodiment, a reliability coefficient can be calculated for each or some or all of the plurality of topics, behaviors, or the like. In such an embodiment, the calculation of these reliability coefficients can include, for example, the identification of topics, behaviors, or the like addressed by a form. The identification of data packets associated with each of some or all of those identified topics, behaviors, or the like, can include retrieval of metadata of each of the data packets and ascertaining association of the data packets with the topics, behaviors, or the like based on the retrieved metadata. After the association of data packets with topics, behaviors, or the like has been determined, metadata for data packets associated with a topic, behavior, or the like can be retrieved and gathered and can be used in calculating a reliability coefficient for that topic, behavior, or the like.

After the content aggregation has been evaluated, the process 750 proceeds to block 772, wherein the content score is compared to a threshold. In some embodiments, the threshold can delineate between acceptable reliability coefficients and unacceptable reliability coefficients. In some embodiments, the threshold can comprise a single threshold, and in some embodiments, the threshold can comprise a plurality of thresholds. In some embodiments, for example in which a reliability coefficients are calculated for the whole form and for portions of the form, a first threshold may be applied to the reliability coefficient for the form and one or several additional thresholds may be applied to reliability coefficients for portions of the form.

The threshold can be retrieved from the database server 104 and specifically from the threshold database 310. The response processor 678 can compare the reliability coefficient to the threshold to determine if the reliability coefficient is acceptable or unacceptable. In some embodiments, the response processor 678 can associated a first value with the content aggregation or portion of the content aggregation if comparison of the reliability coefficient to the threshold indicates that the reliability coefficient is acceptable and a second value with the content aggregation or portion of the content aggregation if comparison of the reliability coefficient to the threshold indicates that the reliability coefficient is unacceptable.

After the content score has been compared to the threshold, the process 750 proceeds to decision state 774, wherein it is determined if the threshold has been exceeded by the content score. In some embodiments, this determination can be based on the results of the comparison of the content score and the threshold. In some embodiments, this can include determining if the first value or if the second value is associated with the content aggregation or portion of the content aggregation associated with the reliability coefficient. The decision at decision state 774 can be performed by the one or several servers 102, the response processor 678, the interface module 492 and/or the design interface module 496.

If it is determined that the content score is acceptable, then the process 750 proceeds to block 776, wherein the content aggregation is stored. In some embodiments, the content aggregation can be stored in the database server 104, and specifically within the content library database 303 of the database server 104.

Returning again to decision state 774, if it is determined that the reliability coefficient is unacceptable, then the process 750 proceeds to block 778, wherein a compliance recommendation is generated. In some embodiments, the compliance recommendation can comprise a recommendation for a change to the content aggregation. In some embodiments, this change can include the addition of one or several data packets to the content aggregation, the removal of one or several packets from the content aggregation, or the like. In some embodiments, the compliance recommendation can comprise a proposed change to the content aggregation, which change would result in an increase in the reliability coefficient and/or the meeting and/or exceeding of the threshold by the reliability coefficient when the content aggregation is modified according to the compliance recommendation. In some embodiments, the compliance recommendation can be generated by the response processor 678, the form application, and/or any other component or module of the content distribution network 100.

The generation of the compliance recommendation can comprise an evaluation of the content components of the content aggregation to identify one or several content components with significant contribution to the unsatisfactory reliability coefficient. In some embodiments, this can include determining, for some or all of the content components, whether each content component increased or decreased the reliability of the content aggregation or of the portion of the content aggregation. In some embodiments, this can further include determining whether other content components increase the reliability of the content aggregation or of the portion of the content aggregation by their addition to the content aggregation and/or by their replacing content components of the content aggregation.

In some embodiments, the generation of the compliance recommendation can include comparing the content aggregation to one or several of the potential groupings identified in block 762. In some embodiments, this comparison can identify and/or indicate differences between the content aggregation and one or several of the potential groupings. These differences can be evaluated to rank the differences from greatest impact on the reliability coefficient to least impact on the reliability coefficient. In some embodiments, some or all of these identified differences and the content components associated with these identified differences are the compliance recommendation.

After the compliance recommendation has been generated, the process 750 proceeds to block 780, wherein the compliance recommendation is sent, and in some embodiments is sent to the supervisor device 110. The compliance recommendation can be sent to the supervisor device 110 by the form application, the interface module 492 and/or the design interface module 496. In some embodiments, the compliance recommendation can be provided to the supervisor device 110 in the form of an alert that can be generated and sent to the supervisor device 110 via the communications network 120. In some embodiments, the alert can include a link that, when selected, launches the application or navigates a web-browser of the device of the selector of the link to page or portal associated with the alert.

Figure 15:
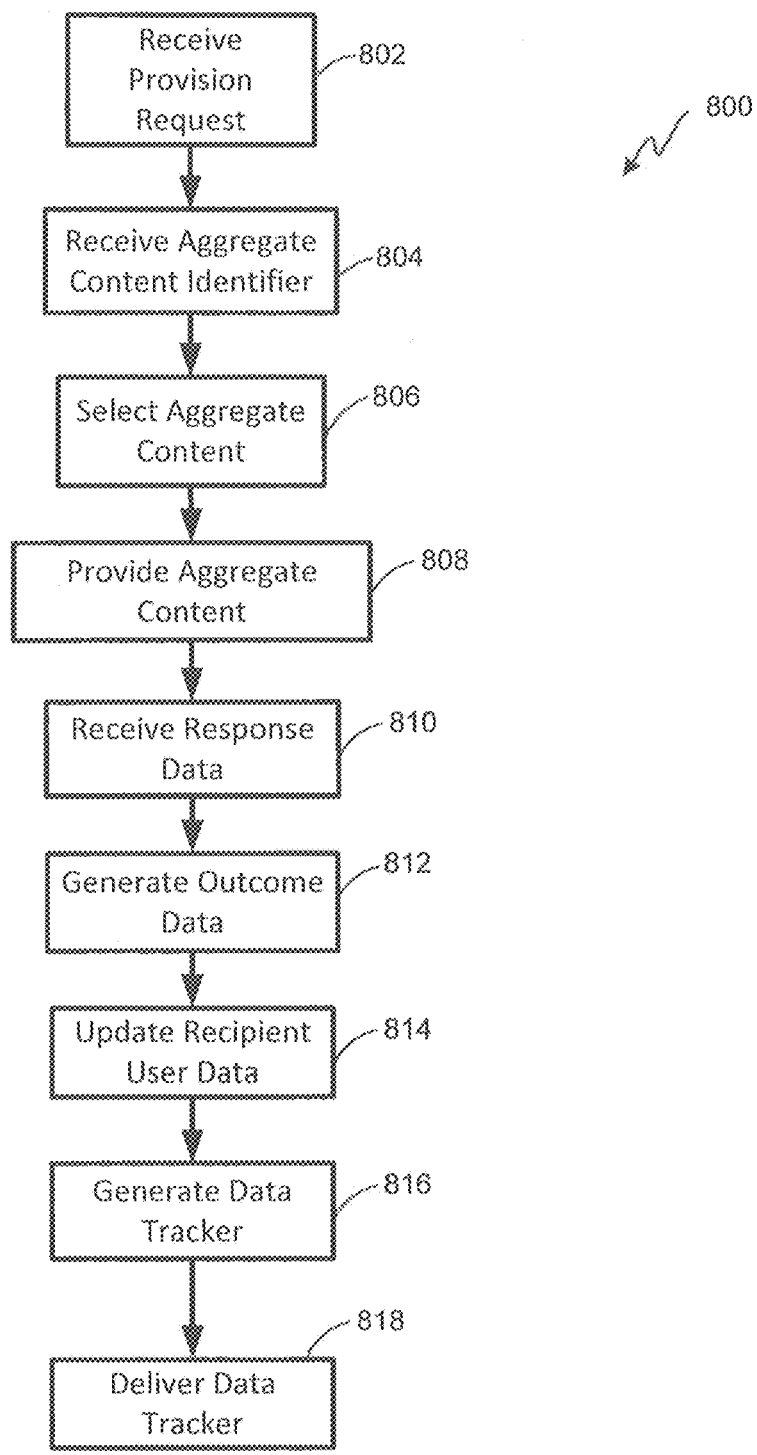
FIG. 15 is a flowchart illustrating one embodiment of a process for automated data tracker delivery.

With reference now to FIG. 15, a flowchart illustrating one embodiment of a process 800 for automated data tracker delivery. The process 800 can be performed by all or portions of the content distribution network 100 and specifically by all or portions of the automatic content remediation notification system 490. The process 800 begins at block 802, wherein a content provision request is received. In some embodiments, the content provision request can be received by the supervisor device 110, the interface module 492, the administrator module 494, and/or the design interface module 496 from the supervisor device 110. In some embodiments, the content provision request can identify a recipient user for receipt of a content aggregation.

After the provision request has been received, the process 800 proceeds to block 804, wherein a content aggregation identifier is received. In some embodiments, the content aggregation identifier can identify the content aggregation for providing to the recipient user. The content aggregation identifier can be received by the supervisor device 110, the interface module 492, the administrator module 494, and/or the design interface module 496 from the supervisor device 110.

After the content aggregation identifier has been received, the process 800 proceeds to block 806, wherein the content aggregation is selected and/or retrieved. In some embodiments, this can be performed by the supervisor device 110, the interface module 492, the administrator module 494, and/or the design interface module 496. The content aggregation can be selected and/or retrieved by querying the content library database 303 for the content aggregation corresponding to the received content aggregation identifier.

After the content aggregation has been selected and/or retrieved, the process 800 proceeds to block 808, wherein the content aggregation is provided. In some embodiments, the content aggregation can be provided by the supervisor device 110, the interface module 492, the administrator module 494, and/or the design interface module 496 to the supervisor device 110 via the communication network 120.

After the content aggregation has been provided, the process 800 proceeds to block 810, wherein response data is received. In some embodiments, the response data can be received by the supervisor device 110, the interface module 492, the administrator module 494, and/or the design interface module 496 from the supervisor device 110 in response to the provided content aggregation. In some embodiments, the response data can comprise data corresponding to user provided inputs responding to some or all of the data packets in the content aggregation.

After the response data has been received, the process 800 proceeds to block 812, wherein outcome data is generated. In some embodiments, this can include providing the received response data to the response processor 678 and the response processor 678 evaluating the received response data. In some embodiments, the response processor 678 can generate a score characterizing the response data. In some embodiments, this score characterizing the response data can be based in part on the one or several additional statistical parameters generated with respect the norm group of the content aggregation. In some embodiments, this can include characterizing the response data with respect to, for example, the mean and/or the standard deviation of the norm group. In some embodiments, this calculated score can comprise a standardized score such as, for example, a T-score.

After the outcome data has been generated, the process 800 proceeds to block 814, wherein the recipient user data is updated. In some embodiments this can be performed by the supervisor device 110, the interface module 492, the administrator module 494, and/or the design interface module 496. In some embodiments, this can include updating one or several attributes of the user profile and/or data relating to the recipient user stored in the database server 104, and specifically with the user profile database 301.

After the recipient user data has been updated, the process 800 proceeds to block 816, wherein a data tracker is generated. In some embodiments, the data tracker can be generated by the one or several servers 102, the interface module 492, the administrator module 494, the design interface module 496, and/or the response processor 678. The data tracker can be generated based on the response data received in block 810 as well as any other previously received relevant response data. In some embodiments, for example, a plurality of content aggregations can be provided to the recipient user over a period of time to track the recipient user's progress. In some embodiments, this progress can relate to how the recipient user is developing a skill, an attribute, or the like. In some embodiments, this progress can relate to whether and/or the degree to which the recipient user is changing a habit or tendency, developing a habit or tendency, or the like. In some embodiments, this progress can relate to changes in the recipient user with respect to one or several metrics measured by the content aggregation.

Figure 16:
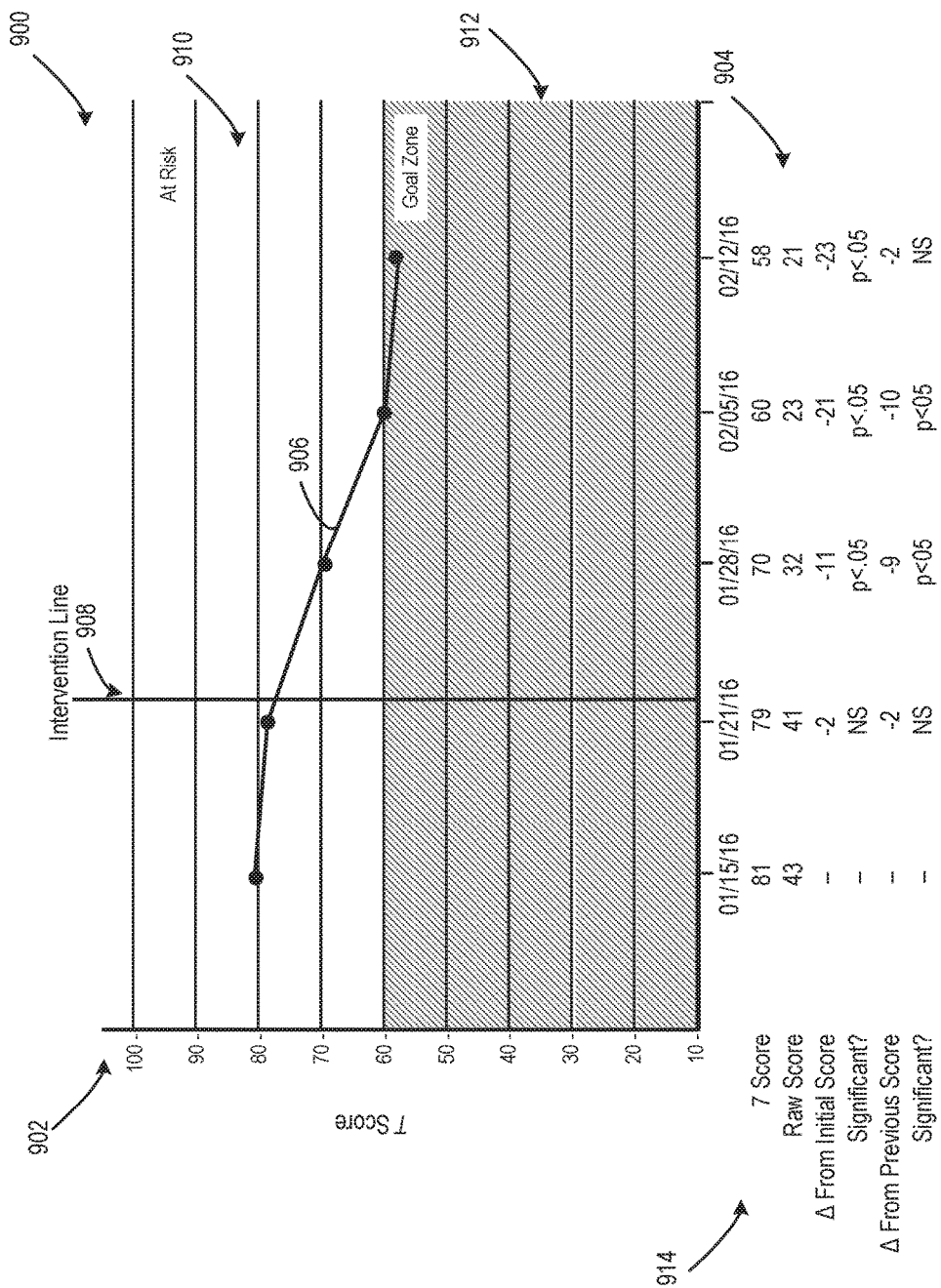
FIG. 16 is a depiction of one embodiment of a data tracker.

One embodiment of the data tracker 900 is shown in FIG. 16. The data tracker 900 can comprise a graphical depiction of user progress over time. The data tracker 900 can include a first axis 902 that can identify score data and a second axis 904 that can identify date data. The data tracker 900 can further include a tracking line 906 that can identify one or several data points generated from responses provided by the recipient user to content aggregations over time.

The data tracker 900 can, in some embodiments, include a time-marker 908 that, in some embodiments, identify when an intervention was provided. As seen in FIG. 16, the time-marker 908 delineates between data collected before, for example, the intervention and data collected after the intervention. In some embodiments, this time marker can facilitate in determining the effectiveness of the provided intervention.

The data tracker 900 can include a first zone 910 and a second zone 912. In some embodiments, each of the first zone 910 and the second zone 912 can correspond to a set of scores. In some embodiments, for example, the first zone 910 corresponds to scores indicating an "at-risk" state in which the recipient user is at risk of an adverse outcome. In some embodiments, the second zone 912 corresponds to scores identifying a "goal zone" in which the recipient user is at lower risk of the adverse outcome. In some embodiments, the first zone 910 can be indicated with a first color and/or pattern and the second zone 912 can be indicated with a second color and/or pattern.

The data tracker can include a data portion 914 that can provide data corresponding to the data identified with the tracking line 906 and/or in addition to the data identified with the tracking line 906. In some embodiments, for example, the data portion can include a T score, a raw score, a value identifying a change from the earliest score, data indicating a statistical significance of the change from the earliest score, a value identifying a change from the immediately previous score, and/or a value indicating a statistical significance of the change from the immediately previous score. In some embodiments, the scores and/or data contained in the data tracker 900 can be generated by the response processor 678 and/or another component of the automatic content remediation notification system 490.

Returning again to process 800, after the data tracker 900 has been generated, the data tracker 900 can be provided as indicated in block 818. In some embodiments, the data tracker can be provided to the supervisor device 110 in the form of an alert that can be generated and sent to the supervisor device 110 from the one or several servers 102 or more specifically from the interface module 492, the administrator module 494, and the design interface module 496 via the communications network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert In some embodiments, this alert can be generated when, for example, the tracking line 906 crosses from the first zone 910 to the second zone 912, or when the tracking line 906 fails to cross from the first zone 910 to the second zone 912 within a specified time frame. In some embodiments, for example, the amount of time passed since time-marker 908 can be tracked. If this amount of time is greater than a threshold value, then an alert can be generated and sent, as discussed herein, to the user device 106 and/or to the supervisor device 110. In some embodiments, the alert can be sent to the creator of the form or forms from which the tracking line 906 is generated, or to the person who assigned the form or forms from which the tracking line 906 is generated. In some embodiments, this alert can include information relating to one or several potential interventions and/or recommending one or several interventions.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for dynamic content recommendation comprising:
   memory comprising:
      a content library database, wherein the content library database comprises:
         a plurality of data packets, each of which comprises a content component to be aggregated into a form content; and
         metadata associated with each of the data packets, wherein the metadata identifies at least one attribute of the associated data packet;
   a first user device comprising:
      a first network interface configured to exchange data via a communication network; and
      a first I/O subsystem configured to convert electrical signals to user interpretable outputs via a Graphical User Interface (GUI);
   a second user device; and
   one or several servers connected to the first user device and the second user device, wherein the one or several servers are configured to:
      receive, from a form management GUI, a content aggregation creation request from the first user device, the content aggregation creation request comprising instructions to automatically launch a form software application configured to generate the form content, comprising an aggregation of at least one content component selected from a form builder GUI within the form software application, to be included in a new and unique form;

filter at least one data packet according to at least one filter request received as a filter selection defining at least one parameter relevant to the form content or the intended recipient from a filter panel on the form builder GUI on the first user device;

provide, in response to a query to the content library database, the at least one data packet to the first user device for display within the content component display window within the form builder GUI;

receive identification of multiple data packets for inclusion in the content aggregation from the filtered data packets, the identification comprising a selection of a name or a subject of at least one content component from the content component display window and inserted into a custom form window within the form builder GUI;

iteratively generate a content score identifying a reliability for the identified multiple data packets;

compare iterations of the content score to a threshold delineating between acceptable content scores and unacceptable content scores;

generate a compliance recommendation based on the compared iterations of the content score to the threshold; and automatically deliver the compliance recommendation to the first user device.

2. The system of claim 1, wherein the content score is generated from an entire content aggregation.

3. The system of claim 1, wherein the content score is generated from a subset of the data packet forming the content aggregation.

4. The system of claim 1, wherein the compliance recommendation comprises at least one data packet for addition to the content aggregation.

5. The system of claim 4, wherein the compliance recommendation comprises at least one data packet for removal from the content aggregation.

6. The system of claim 5, wherein automatically delivering the compliance recommendation comprises generating an alert comprising the compliance recommendation and sending the alert to the first user device.

7. The system of claim 6, wherein the alert comprises code configured to direct the first I/O subsystem of the first user device to automatically display data contained in the alert upon receipt of the alert.

8. The system of claim 7, wherein the content score comprises a reliability score.

9. The system of claim 8, wherein the one or several servers are further configured to retrieve at least one threshold from the memory.

10. The system of claim 8, wherein the content score is iteratively generated from the metadata associated with the data packets forming the content aggregation, wherein the metadata is retrieved from the content library database.

11. A method for dynamic content recommendation, the method comprising:

receiving, from a form management Graphical User Interface (GUI), a content aggregation creation request at one or several servers from a first user device via a wireless network, the content aggregation creation request comprising instructions to automatically launch a form software application configured to generate a form content, comprising an aggregation of at least one content component selected from a form builder GUI within the form software application, to be included in a new and unique form;

filtering with the one or several servers at least one data packet according to at least one filter request received as a filter selection defining at least one parameter relevant to the form content or the intended recipient from a filter panel on the form builder GUI on the first user device;

providing, in response to a query to a content library database, the at least one data packet with the one or several servers to the first user device for display within a content component display window within the form builder GUI;

receiving at the one or several servers identification of multiple data packets from the filtered data packets for inclusion in the content aggregation from a selection of a name or a subject of at least one content component from the content component display window and inserted into a custom form window within the form builder GUI on the first user device;

iteratively generating a content score identifying a reliability for the identified multiple data packets with the one or several servers;

comparing iterations of the content score to a threshold delineating between acceptable content scores and unacceptable content scores with the one or several servers;

generating with the one or several servers a compliance recommendation based on the compared iterations of the content score to the threshold; and automatically delivering with the one or several servers the compliance recommendation to the first user device.

12. The method of claim 11, wherein the content score is generated from the entire content aggregation.

13. The method of claim 11, wherein the content score is generated from a subset of the data packet forming the content aggregation.

14. The method of claim 11, wherein the compliance recommendation comprises at least one data packet for addition to the content aggregation.

15. The method of claim 14, wherein the compliance recommendation comprises at least one data packet for removal from the content aggregation.

16. The method of claim 15, wherein automatically delivering the compliance recommendation comprises generating an alert comprising the compliance recommendation and sending the alert to the first user device.

17. The method of claim 16, wherein the alert comprises code configured to direct the second I/O subsystem of the first user device to automatically display data contained in the alert upon receipt of the alert.

18. The method of claim 17, wherein the content score comprises a reliability score.

19. The method of claim 18, further comprising retrieving at least one threshold from memory.

20. The method of claim 18, wherein the content score is iteratively generated from the metadata associated with the data packets forming the content aggregation, wherein the metadata is retrieved from the content library database.

* * * * *